United States Patent [19]

Brinkhof et al.

[11] 4,175,229
[45] Nov. 20, 1979

[54] ENGINE BLOCK HEATER

[75] Inventors: Joseph B. Brinkhof, Brampton; Raymond R. Datt, Mississauga, both of Canada

[73] Assignee: Canadian General Electric Company Limited, Toronto, Canada

[21] Appl. No.: 821,240

[22] Filed: Aug. 2, 1977

[30] Foreign Application Priority Data

Nov. 12, 1976 [CA] Canada .................................. 265449

[51] Int. Cl.² ........................ H05B 3/02; H05B 3/82; F02N 17/06
[52] U.S. Cl. ..................................... 219/208; 85/3 K; 123/142.5 E; 219/336; 219/536; 220/248; 220/251; 248/56; 403/252
[58] Field of Search ............... 219/202, 205, 208, 312, 219/316, 318, 335, 336, 526, 536, 542; 123/142.5 R, 142.5 E; 285/206, 208, 209, 210; 215/264, 267, 279, 283, 294, 360; 85/3 R, 3 K, 3 S, 63; 292/212; 248/56; 138/89, 92; 403/252, 297; 220/243, 246, 248, 251

[56] References Cited

U.S. PATENT DOCUMENTS

| 737,667 | 9/1903 | Schunck | 22/251 X |
|---|---|---|---|
| 1,094,911 | 4/1914 | Lautenbacher et al. | 220/248 |
| 2,024,871 | 12/1935 | Parsons | 85/3 K |
| 2,987,283 | 6/1961 | Bleckmann | 219/336 |
| 3,091,356 | 5/1963 | Simpkins | 220/248 |
| 3,766,356 | 10/1973 | Feldmann | 219/336 X |
| 3,920,145 | 11/1975 | McGregor et al. | 85/3 S |

FOREIGN PATENT DOCUMENTS 850767  9/1970  Canada .................................... 219/208

Primary Examiner—A. Bartis
Attorney, Agent, or Firm—Raymond A. Eckersley

[57] ABSTRACT

An automobile engine jacket heater includes a body member having a metal sheathed heating element projecting from the reverse face thereof. An expandable yoke assembly is provided on the reverse face of the body member for securing the heater in an aperture of the engine jacket. The yoke assembly includes a plurality of outwardly divergent wing members and a clamp member movable toward and away from the reverse face of the body member by a single screw operable from the obverse face of the body member for spreading the wing members into engagement with the interior surfaces of the engine jacket after the heater is inserted into the jacket aperture. The screw is loosely journaled in an aperture in the body member of larger diameter than that of the screw threads whereby the screw can be canted to an angle of at least 10 to 15 degrees relative to the face of the body member. The wing members are separately formed and have an enlarged aperture at their inner end through which the screw passes. The enlarged aperture permits the wing members to independently pivot in the axial plane of the screw. Cheeks on the wing member retain the wing members and clamp member in unitary assembled relationship.

9 Claims, 4 Drawing Figures

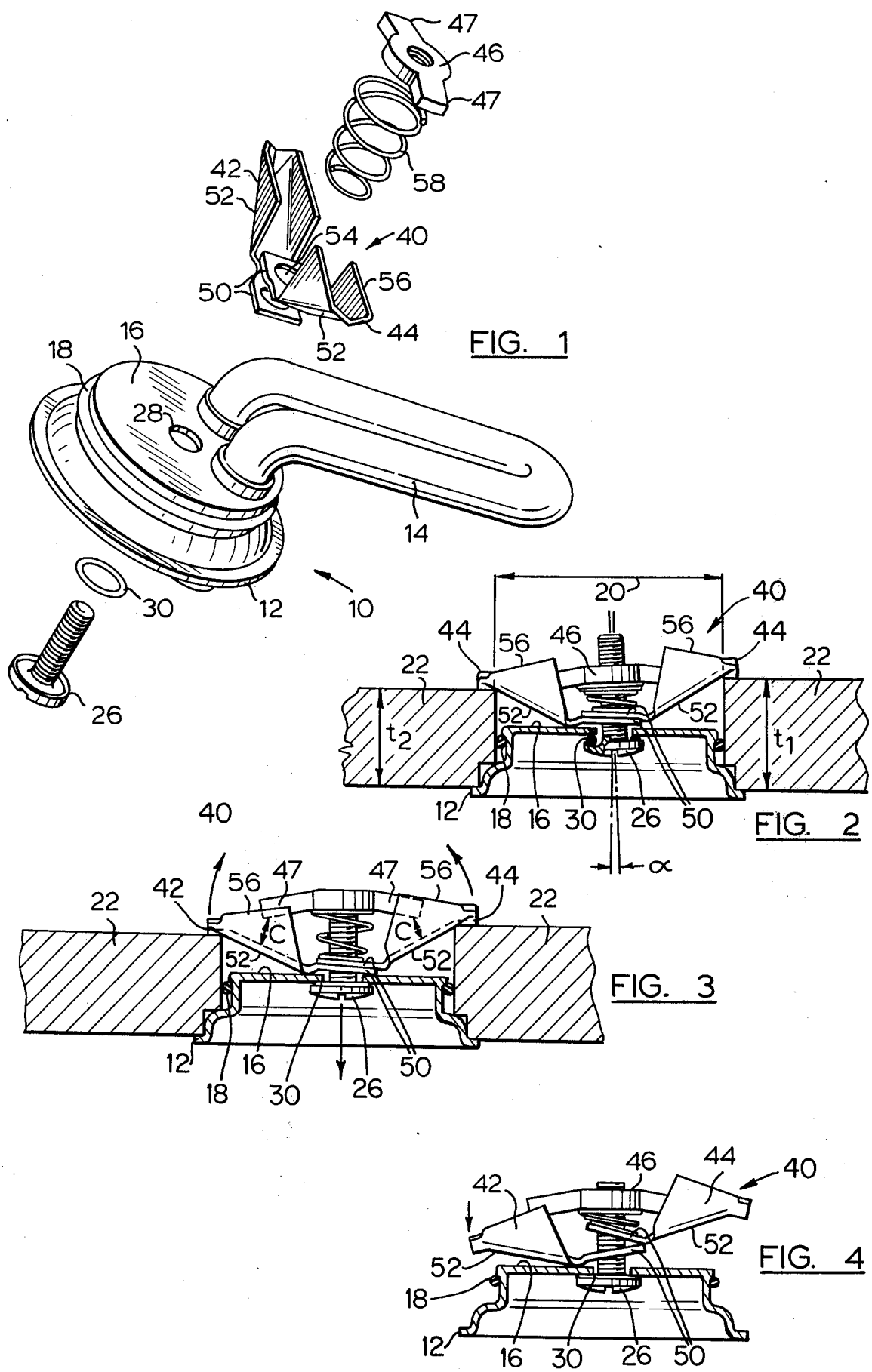

ENGINE BLOCK HEATER

This invention is concerned with water cooled internal combustion engines, and in particular with electrical heaters therefor of a type which may be inserted into an aperture in the engine block.

In the construction of internal combustion engines adapted to be water cooled it is common practice to cast the cylinder block and water jacket in one piece using sand moulding. Apertures are provided for the removal of the sand following the casting operation; when the engines are finally assembled the apertures may be sealed with suitably dished plates.

Advantage is commonly taken of the apertures for the fitting of an electric heating means for the engine. A suitable device of the prior art is described in Canadian Pat. No. 850,767, dated Sept. 1, 1970 to Ehgoetz, of common assignment herewith. The Ehgoetz device comprised a dished body from which a metal sheathed heating element projects; around the periphery of the body is carried an O sealing ring, which seals against the bore of the aperture in the engine block. The retaining means employed by the patentee comprised a bar yoke which is attached to the body by a screw means loosely journaled in the body. The yoke is of greater length than the diameter of the aperture and it is required to be manipulated therethrough by suitably tilting the assembly, following which the yoke is drawn tight.

In certain automotive engines the spatial requirements have not permitted the ready introduction of a yoke of the type described by Ehgoetz. It is known in the prior art, for example as described in U.S. Pat. No. 2,987,283, issued June 6, 1961 to Bleckmann, to employ a composite yoke having a boundary less than that of the aperture to be fitted. As the yoke is drawn down, bendable or hinged members are spread outwardly so as to engage an inner wall surface to which the heater is fitted. Whilst the patentee teaches that the heater may be withdrawn by loosening the yoke screw and pulling on the body of the heater so as to reversably deflect the bendable members, this is not readily performed with automotive type heaters due perhaps to their relatively small body size which does not permit them to be grasped firmly, particularly in view of spatial limitations which are often present. A further problem is that it is desirable, at least in order to reduce the installation time and also because of spatial limitations, that the bendable assembly just pass through the aperture. Should the outwardly divergent legs of the bendable yoke snag on the aperture or during earlier handling, the legs will tend to open so as not to permit passage, requiring the part to be re-worked.

It is a principal object of the present invention to provide a heater of the aforesaid type having an improved yoke assembly which facilitates both insertion and withdrawal of the heater.

It is a further object of the present invention to provide in said heater assembly a yoke assembly wherein the legs are capable of independent movement to a degree whereby, upon release of screw pressure subsequent to the installation of the heater, the legs of the assembly may be pivoted in a simple manner so as to clear the walls forming the aperture such that the heater may be readily withdrawn.

It is a still further object of the present invention to provide in said heater assembly a yoke assembly wherein prior to the installation of the heater the legs of the assembly may be independently and reversibly deflected without causing a set therein whereby their spread would be increased undesirably.

Briefly stated and in accordance with one embodiment of the invention, a heater for insertion into an aperture in an engine block or the like comprises a body member having obverse and reverse faces, with a metal sheathed heating element projecting from the reverse face. A yoke assembly comprising a first member is located rearwardly of the reverse face and is connected to the body member by a single screw means operable from the obverse face of the body member so as to vary the spacing between the body member and the first member. The yoke assembly further comprises at least two wing members each having a first end and a second end subtending an obtuse angle to the first end. The wing members are assembled with each said first end adjacent the body member and with said first end pivotally connected to the screw means, and with the second ends diverging from the body in generally opposed direction. Normally there will be a pair of wing members having a common longitudinal axis. The first portion of the yoke assembly has ends which are respectively slidable on each wing member, the first portions and the wing members being maintained in unitary assembled relationship by cheeks which may be formed on either the first member or the wing members or both. The yoke assembly members are proportioned such that in plan form the yoke assembly has an effective boundary area which is not appreciably greater than that of the aperture to which the heater is to be fitted.

Upon actuation of the screw means so as to move the first member of the yoke assembly forwardly i.e. towards the body of the heater, the second portions each wing member will be caused to describe an outward and forward path so as to increase the effective planform area of the yoke assembly, whereby distal portions of each wing member will engage a peripheral portion of the engine block bounding the aperture. Upon subsequent actuation of the screw means so as to move the first member of the yoke assembly rearwardly, the wing members which are pivotally connected to the screw means may pivot to a position wherein the plan form area of the yoke assembly is decreased, thus enabling the heater to be withdrawn.

The subject matter of the present invention is particularly pointed out and distinctly claimed in the concluding portion of the specification. The invention, however, together with the further objects and advantages thereof may be better understood with reference to the following description of a preferred embodiment thereof, taken in conjunction with the accompanying drawings wherein:

FIG. 1 shows the heater from the reverse face is exploded perspective view;

FIG. 2 is an elevational view of the assembled heater installed in an engine block;

FIG. 3 is similar to FIG. 2, but shows the retaining screw slackened off prior to withdrawal of the heater; and FIG. 4 shows the heater of FIG. 1 wherein the yoke members undergo independent resilient deflection under the action of a temporary external force.

Referring now to the figures in detail, an engine block heater which is denoted generally by the numeral 10 comprises a disc like body member 12 having a hairpin shaped metal sheathed heating element 14 supported from the reverse face 16 of the body member. The peripheral edge of body member 12 is grooved to receive an O sealing ring 18 having a diameter marginally greater than that of an aperture 20 provided in the wall 22 of an engine block. For further details of this generally known arrangement reference may be had to the prior Ehgoetz patent, and also to Heinbuch, Canadian Pat. No. 700,836 dated Dec. 29, 1964, commonly assigned herewith.

A clamping means for retaining heater 10 in sealing position in aperture 20 comprises a yoke assembly, 40, and screw means 26 which here consists of a simple machine screw journaled in aperture 28 which is centrally located in body member 12. O ring seal 30 circumscribes screw 26 beneath the head thereof to seal aperture 28.

Yoke assembly 40 includes a pair of wing members 42, 44 which may suitably be identical as herein. Each wing has a first end, 50 and a second end, 52, which substends an obtuse angle of about 135° to the first end. The first end of each wing is apertured at 54 to provide a journal opening for the passage of screw 26 therethrough. The pair of wing members 42, 44 are assembled on screw 26 with their first ends 50 adjacent to the reverse face 16 of body member 12 and the second ends diverging therefrom in diametric opposition. The yoke assembly further comprises a first member 46 which surmounts wing members 42, 44 and which threadably receives screw 26 in a central bore therein. Actuation of screw 26, which is accessible from the obverse face of body member 12, thus serves to vary the spacing of first member 46 from body member 12. Obviously other simple screw means could be employed to effect this variation, such as where screw 26 is captively journaled in first member 46 and either threadably received in disc aperture 28 or wherein a nut means operable from the obverse face of body member 12 is used to vary the effective length of the screw. Preferably the screw means will be screw 26 journalled in aperture 28. Aperture 28 will have a diameter slightly larger than that for the threads of screw 26 which will permit screw 26 to cant to an angle of at least about 10°–15° with respect to face 16 of body member 12 for a purpose to be further described.

Wing members 42, 44 are grooved along the length of second ends 52 thereby forming upstanding cheek member 56. End portions 47 of first member 46 bear respectively upon portions 52 of wing members 42, 44 to slide thereon as the spacing between first member 46 and body member 12 is decreased upon the actuation of screw 26. Cheek members 56 retain end portions 47 in their engaged relationship with the wing members, and also retain the wing members in diametric opposition, thereby unifying the yoke assembly. Of course cheek members 56 could be formed on first member 46 should this be desired.

Since it is desired to pass the yoke assembly 40 through block aperture 20 with the minimum manoeuvering it will generally be ensured that the yoke member has a planform boundary which is not appreciably greater and which is desirably smaller than the boundary of the aperture. In the present embodiment the tip to tip length of the yoke assembly is marginally smaller than the diameter of aperture 20. Following insertion of yoke assembly 40, screw 26 is actuated from the obverse face of body member 12 so as to tighten first member 46. As this slides down the inclined surfaces of wing members 42, 44 these will spread outwardly so as to increase their effective planform boundary until they engage peripheral portions of the engine block bounding aperture 20, as in FIG. 2. In this preferred embodiment wing members 42, 44 are constructed of brass which permits second end portions 52 to bend relative to first end portions 50 as screw 26 is tightened. However in a second embodiment of the invention apertures 54 in wings 42, 44 are made sufficiently large to permit pivotal movement of the wing members in the axial plane of screw 26; in such embodiment wing members 42, 44 may be constructed of relatively rigid material. In practice wing members 42, 44, even when constructed from a bendable material, are provided with apertures 54 of a size to permit the pivotal movement spoken of, thereby permitting a combination pivoting and bending action when the yoke assembly is tightened. Also, as seen in FIG. 3, when it is desired to withdraw heater 10 from the engine block and screw 26 is actuated to slacken off first member 46, the inclined surfaces 52 of the deformed wing members 42, 44 no longer abut ends 47 of first member 46, having a clearance shown as c therefrom. The wing members may thus undergo upward pivotal movement as the body of the heater 10 is pulled forwardly, thereby decreasing the planform area of the yoke assembly so that it becomes less than that of engine block aperture 20.

It will be evident that where wing apertures 54 are oversized so as to permit a pivotal movement of the wing members in the axial plane of screw 26, the wings will normally spread apart under the influence of gravity. Cheek members 56 desirably have a sufficient height such that when the wing members pivot to their fullest opening first member 46 will always be retained in position to unify the yoke assembly. It is preferred that a collapsible spacer means be provided so as to maintain the wing members 42, 44 in their upright position prior to fitting the first member. Preferably the collapsible means will be resilient, a helical compression spring 58 being preferred for this purpose. As mentioned earlier, one disadvantage of the prior art folded yokes was the possibility of the yoke being enlarged prior to it being introduced into an aperture such that it required reworking to permit the introduction. The present invention largely overcomes this disadvantage by permitting the wing members 42, 44 to deflect under the influence of a moderate load, as seen in FIG. 4, following the removal of which load the yoke assembly reverts to its prior condition.

Where the wing aperture 54 of at least one wing member is not oversized, cheek members 56 on at least one wing member will be made having a lesser height than that depicted such that in the condition shown in FIG. 3, first member 46 would no longer be engaged in the groove of at least one wing member. This would then permit a pivotal movement of that wing member about the axis of screw 26, thus reducing the effective planform area of the yoke assembly to permit the yoke to be withdrawn.

Where as herein wing members 42, 44 of yoke assembly 40 are identical, it will be apparent that when the yoke assembly is assembled as depicted one wing member will be marginally higher than the other, and that in order to engage a wall of equal thickness upon each side of block aperture 20, the higher wing member must undergo a greater angular deflection than the lower wing member. In practice engine block castings are frequently designed such that the thickness of metal upon one side of the aperture is not identical with that on the opposed side. This is depicted in FIG. 2, where in a specific instance the design thicknesses shown as $t_1$ and $t_2$ are respectively 15.0 mm and 12.5 mm. It will be apparent that in this instance the inequality in height of the two sides of the yoke assembly will be beneficial. In general however, it is preferred that screw 26 be loosely journaled in body aperture 28 so as to permit the screw to cant at a small angle shown in FIG. 2 as $\alpha$ of up to about 15°, thus permitting yoke assembly 40 to assume a skew position when tightened. O ring seal 30 provides a satisfactory seal under these circumstances. It is still further preferred that screw 26 be inclinable at up to about 45° to face 16 to facilitate skew entry and withdrawal of yoke assembly 40 through aperture 20 when spatial limitations permit.

What we claim as new and desire to secure by Letters Patent of the United States is:

1. A heater for insertion into an aperture in an engine block comprising
    a body member having obverse and reverse faces,
    a metal sheathed heating element projecting from said reverse face,
    a yoke assembly comprising
        (i) a first member located rearwardly of said reverse face and connected to said body member by a single screw means operable from said obverse face to vary the spacing between said body member and said first member, and
        (ii) at least two separate and independently movable wing members each having a first end and a second end subtending an obtuse angle to said first end, said wing members being assembled such that each said first end is positioned between said body member and said first member with said second ends diverging away from the reverse face of said body member in generally opposed directions,
    said wing members being pivotally connected to said single screw means through a journal opening in each said first end, at least one of said wing members having said opening dimensioned so as to permit pivotal movement of that wing member in the axial plane of said screw,
    said first member having portions thereof repectively slidable on the second end of each said wing member,
    cheek members associated with said first member and each said wing member to retain said wing members in unitary assembled relationship with said first member,
    said yoke assembly having an effective planform boundary, when said first member is spaced from said body member a certain distance, not appreciably greater than that defining the aperture of said block, so that said yoke assembly can be inserted into the engine block through said aperture to position said heating element within the block, and
    actuation of said screw means so as to move said first member towards said body member causing the second end of each said wing member to describe an outward and forward path so as to increase said effective planform area whereby distal portions of each said wing member respectively engage internal peripheral portions of said engine block bounding said aperture.

2. The combination of claim 1 wherein each of said wing members includes an intermediate deformable portion.

3. The combination of claim 1 wherein a helical compression spring is provided between said first member and said wing members.

4. The combination of claim 1 wherein the second end of each of said wing members has a groove at least partially along its length from which longitudinal walls upstand to form said cheek members.

5. The combination of claim 1 wherein two wing members are employed.

6. The combination of claim 5 wherein said two wing members are identical.

7. A heater for insertion into an aperture in an engine block comprising
    a body member having obverse and reverse faces,
    a metal sheathed heating element projecting from said reverse face,
    a yoke assembly comprising
        (i) a first member located rearwardly of said reverse face and connected to said body member by a single screw means operable from said obverse face to vary the spacing between said body member and said first member, and
        (ii) at least two separate and independently movable wing members each having a first end and a second end subtending an obtuse angle to said first end, said wing members being assembled such that each said first end is positioned between said body member and said first member with said second ends diverging away from the reverse face of said body in generally opposed directions,
    said first end of each wing member being pivotally connected to said screw means,
    said first member having portions thereof respectively slidable on the second end of each said wing member,
    cheek members associated with said first member and each of said wing members to retain said wing members in unitary assembled relationship with said first member, said cheek members including longitudinal walls upstanding from the sides of each said second end of said wing members, said walls increasing in height towards said first end,
    said yoke assembly having an effective planform boundary, when said first member is spaced from said body member a certain distance, not appreciably greater than that defining the aperture of said block so that said yoke assembly can be inserted into the engine block through said aperture to position said heating element within the block, and
    actuation of said screw means so as to move said first member towards said body member causing the second end of each said wing member to describe an outward and forward path so as to increase said effective planform area whereby distal portions of each said wing member respectively engage internal peripheral portions of said engine block bounding said aperture.

8. The combination of claim 7 wherein said single screw means is a machine screw passing loosely through said body member so as to be inclinable thereto at an angle of about 15 degrees.

9. The combination of claim 7 wherein a collapsible spacing means is provided between said first member and said first end of each of said wing members.

* * * * *